US007528836B2

(12) United States Patent
Diard

(10) Patent No.: US 7,528,836 B2
(45) Date of Patent: May 5, 2009

(54) PROGRAMMING MULTIPLE CHIPS FROM A COMMAND BUFFER

(75) Inventor: Franck R. Diard, Mountain View, CA (US)

(73) Assignee: Nvidia Corporation, Santa Clara, CA (US)

(*) Notice: Subject to any disclaimer, the term of this patent is extended or adjusted under 35 U.S.C. 154(b) by 390 days.

(21) Appl. No.: 11/326,871

(22) Filed: Jan. 6, 2006

(65) Prior Publication Data

US 2006/0114260 A1    Jun. 1, 2006

Related U.S. Application Data

(62) Division of application No. 10/639,893, filed on Aug. 12, 2003, now Pat. No. 7,015,915.

(51) Int. Cl.
G06F 15/80    (2006.01)
G06F 13/14    (2006.01)
G06T 15/00    (2006.01)

(52) U.S. Cl. .................... 345/505; 345/522; 345/520

(58) Field of Classification Search ......... 345/502–506, 345/522, 520, 553
See application file for complete search history.

(56) References Cited

U.S. PATENT DOCUMENTS 5,293,480 A *  3/1994  Miller et al. ................ 345/502
5,790,130 A    8/1998  Gannett
6,046,752 A *  4/2000  Kirkland et al. ............. 345/505
6,078,339 A    6/2000  Meinerth et al.
6,266,072 B1   7/2001  Koga et al.
6,570,571 B1   5/2003  Morozumi
6,747,654 B1 * 6/2004  Laksono et al. ............. 345/502

OTHER PUBLICATIONS

Computer Graphics, 26, Jul. 2, 1992, "PixelFlow: High-Speed Rendering using Image Composition", by Steven Molnar et al, pp. 231-240.

* cited by examiner

Primary Examiner—Hau H Nguyen
(74) Attorney, Agent, or Firm—Townsend and Townsend and Crew, LLP

(57) ABSTRACT

A CPU selectively programs one or more graphics devices by writing a control command to the command buffer that designates a subset of graphics devices to execute subsequent commands. Graphics devices not designated by the control command will ignore the subsequent commands until re-enabled by the CPU. The non-designated graphics devices will continue to read from the command buffer to maintain synchronization. Subsequent control commands can designate different subsets of graphics devices to execute further subsequent commands. Graphics devices include graphics processing units and graphics coprocessors. A unique identifier is associated with each of the graphics devices. The control command designates a subset of graphics devices according to their respective unique identifiers. The control command includes a number of bits. Each bit is associated with one of the unique identifiers and designates the inclusion of one of the graphics devices in the first subset of graphics devices.

7 Claims, 7 Drawing Sheets

PROGRAMMING MULTIPLE CHIPS FROM A COMMAND BUFFER

CROSS-REFERENCE TO RELATED APPLICATIONS

This application is a divisional of U.S. patent application Ser. No. 10/639,893, filed Aug. 12, 2003, which disclosure is incorporated herein by reference for all purposes.

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem. Typically, the CPU performs high level operations, such as determining the position, motion, and collision of objects in a given scene. From these high level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

To maximize rendering performance, the graphics processing subsystem may include two or more graphics processing units (GPUs) operating in parallel. The graphics processing units can divide the rendering workload in a number of different ways. For example, different portions of an image can be rendered in parallel by different GPUs. The portions are then combined to produce a complete rendered image. In another example parallel rendering scheme, each GPU renders one image in a sequence of images.

Programming multiple GPUs with a CPU is one difficulty arising from parallel rendering schemes. In parallel rendering schemes, GPUs require a mixture of rendering commands common to all of the GPUs in the graphics processing subsystem and rendering commands specific to each GPU. However, programming each GPU with different rendering commands and data often requires a large allocation of system resources for each GPU. This programming overhead makes parallel rendering schemes inefficient and in some cases even limits the total number of GPUs that can be used by the graphics processing subsystem.

Therefore, it is desirable to have an efficient system and method for programming multiple graphics processing units with rendering commands while consuming a minimal amount of system resources. It is further desirable to be able to program multiple graphics processing units with both rendering commands common to all of the graphics processing units and rendering commands specific to one or more graphics processing units.

BRIEF SUMMARY OF THE INVENTION

An embodiment of the invention enables the CPU to selectively program one or more graphics devices by writing a control command to the command buffer that designates a subset of graphics devices to execute one or more subsequent commands. Graphics devices that are not designated by the control command will ignore the subsequent commands until re-enabled by the CPU. The non-designated graphics devices will continue to read from the command buffer to maintain synchronization. Subsequent control commands can designate a different subset of graphics devices to execute further subsequent commands. Graphics devices include graphics processing units and graphics coprocessors.

In an embodiment, a method for programming a graphics subsystem includes communicating a first command with each of the plurality of graphics devices. The first command designates at least a first portion of the plurality of graphics devices to execute a second command subsequent to the first command. The second command is communicated with each of the plurality of graphics devices. The second command is executed only by the first portion of the plurality of graphics devices. The second command can be a device specific rendering command, or alternatively, a common rendering command. In an embodiment, the first and second commands are communicated with each of the plurality of graphics devices via a single memory aperture.

A further embodiment of the method associates a unique identifier with each of the plurality of graphics devices. The first command designates the first portion of the plurality of graphics devices according to their respective unique identifiers. In yet a further embodiment, the first command includes a plurality of bits. Each bit is associated with one of the unique identifiers and adapted to designate the inclusion of one of the plurality of graphics devices in the first portion of the plurality of graphics devices.

An embodiment of the method can be used to assign a first portion of an image to be rendered by the first portion of the plurality of graphics devices and to assign a second portion of the image to be rendered by the second portion of the plurality of graphics devices. In an alternate embodiment, the method assigns a first image to be rendered by the first portion of the plurality of graphics devices and assigns a second image to be rendered by the second portion of the plurality of graphics devices. In yet another alternate embodiment, the method assigns rendering data within a first portion of an image to be rendered by the first portion of the plurality of graphics devices and assigns rendering data within both the first portion and a second portion of the image to be rendered by the first and second portions of the plurality of graphics devices.

BRIEF DESCRIPTION OF THE DRAWINGS

The invention will be described with reference to the drawings, in which.

DETAILED DESCRIPTION OF THE INVENTION

Figure 1:
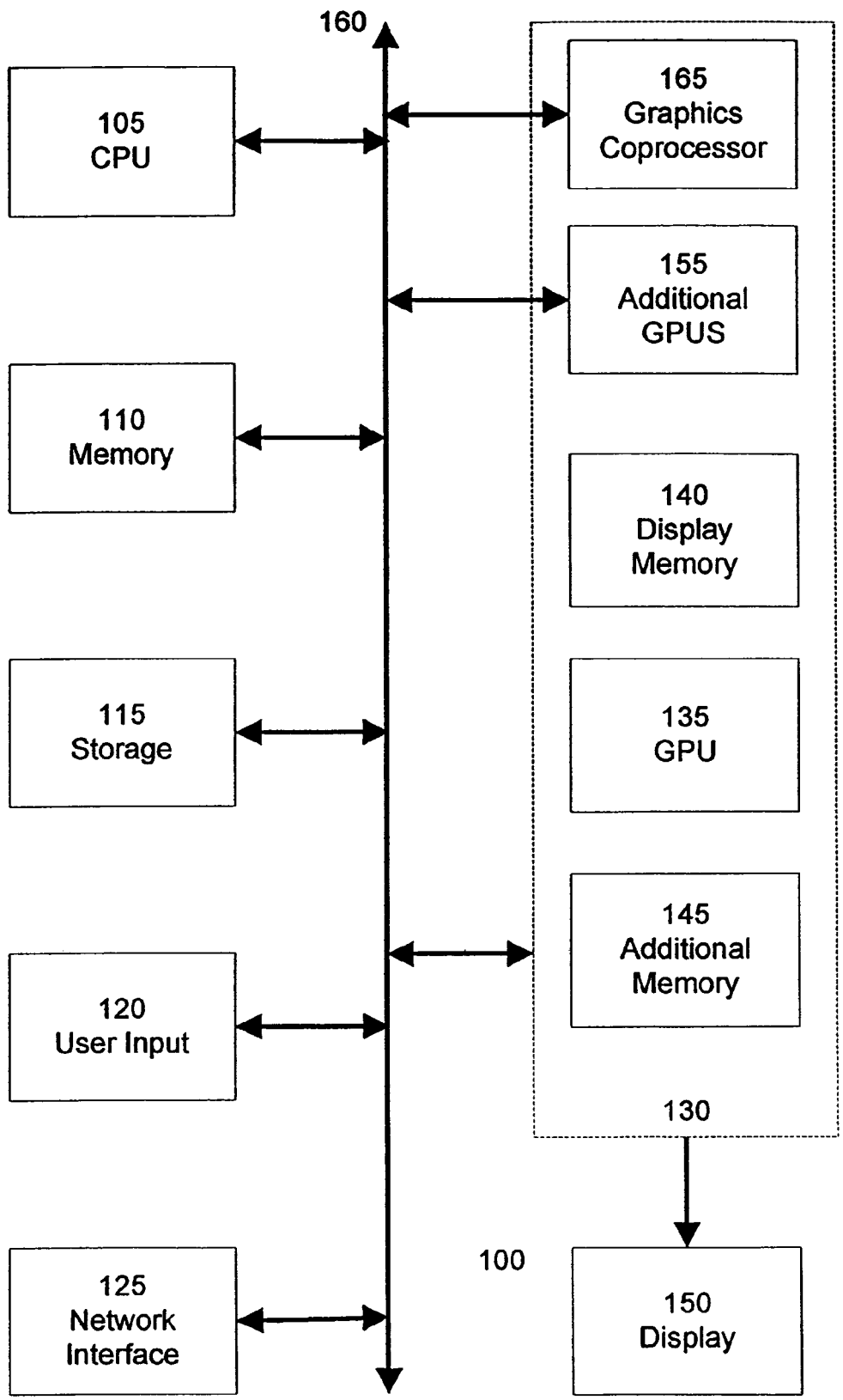
FIG. 1 is a block diagram of a computer system suitable for practicing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. In an embodiment, CPU 105 is actually several separate central processing units operating in parallel. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160. Examples of data buses include ISA, PCI, AGP, PCI, PCI-X, and Hypertransport data buses.

A graphics subsystem 130 is further connected with data bus 160 and the components of the computer system 100. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or commands defining the desired output images, from which the GPU 135 generates the pixel data of one or more output images. The data and/or commands defining the desired output images is stored in additional memory 145. In an embodiment, the GPU 135 generates pixel data for output images from rendering commands and data defining the geometry, lighting, shading, texturing, motion, and/or camera parameters for a scene.

In another embodiment, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 218 and displayed on display device 150. Display device 150 is any device capable of displaying visual information in response to a signal from the computer system 100, including CRT, LCD, plasma, and OLED displays. Computer system 100 can provide the display device 150 with an analog or digital signal.

In a further embodiment, graphics processing subsystem 130 includes one or more additional GPUs 155, similar to GPU 135. In an even further embodiment, graphics processing subsystem 130 includes a graphics coprocessor 165. Graphics processing coprocessor 165 and additional GPUs 155 are adapted to operate in parallel with GPU 135. Additional GPUs 155 generate pixel data for output images from rendering commands, similar to GPU 135. Additional GPUs 155 can operate in conjunction with GPU 135 to simultaneously generate pixel data for different portions of an output image, or to simultaneously generate pixel data for different output images. In an embodiment, graphics coprocessor 165 performs rendering related tasks such as geometry transformation, shader computations, and backface culling operations for GPU 135 and additional GPUs 155.

Additional GPUs 150 can be located on the same circuit board as GPU 135 and sharing a connection with GPU 135 to data bus 160, or can be located on additional circuit boards separately connected with data bus 160. Additional GPUs 155 can have their own display and additional memory, similar to display memory 140 and additional memory 145, or can share memories 140 and 145 with GPU 135. In an embodiment, the graphics coprocessor 165 is integrated with the computer system chipset (not shown), such as with the Northbridge chip used to control the data bus 160.

Figure 2A:
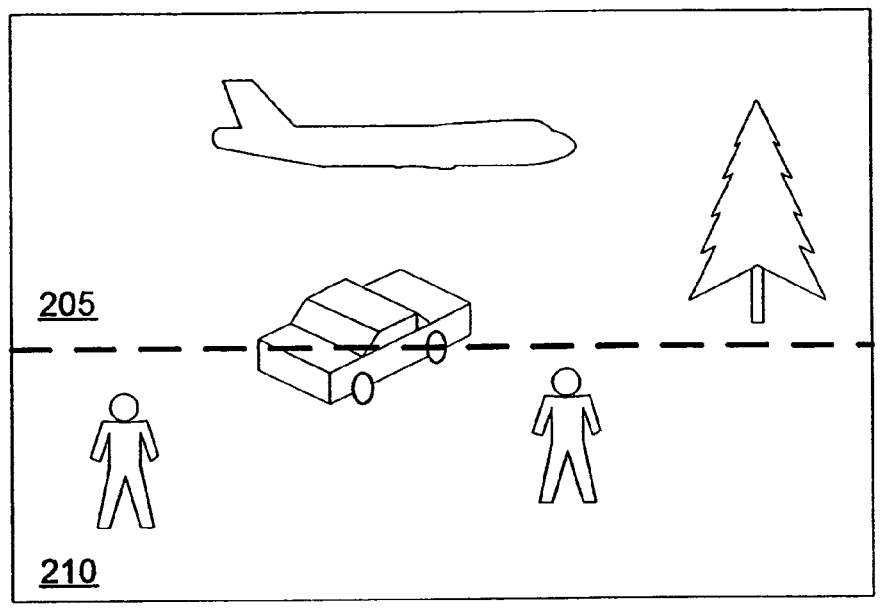
FIGS. 2A and 2B illustrate a method for rendering portions of an image in parallel and a prior system for programming graphics processing units to perform the same.
Figure 2B:
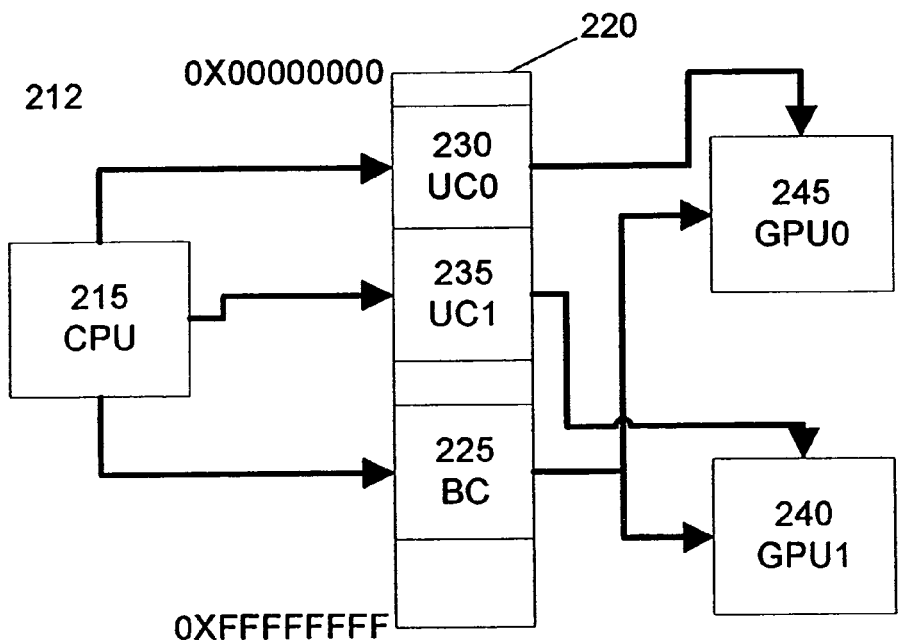

FIGS. 2A and 2B illustrate a method for rendering portions of an image in parallel and a prior system for programming graphics processing units to perform the same. Image 200 represents an example output image to be rendered by two or more GPUs operating in parallel. Image 200 is rendered by splitting the image into different portions, with each portion rendered by at least one GPU. In this example, image portion 205 is rendered by a first GPU and image portion 210 is rendered by a second GPU.

In general, split-frame parallel rendering schemes such as that illustrated by FIG. 2A require GPUs to be programmed with a combination of common rendering commands, which are executed by all of the GPUs of the system, and specific rendering commands, which are executed by a subset of the GPUs of the system. In the example of FIG. 2A, both GPUs are programmed with common rendering commands necessary to render all of the geometry and shading of the scene. The GPUs are then programmed with separate rendering commands to define clipping windows corresponding to image portions 205 and 210.

FIG. 2B illustrates a prior system 212 for programming graphics processing units to perform the same. System 212 uses memory-mapped I/O to communicate rendering commands and data between the CPU 215 and the GPUs 240 and 245. In memory-mapped I/O, commands and data written to a predetermined range of memory addresses is communicated to the GPUs 240 and 245, and conversely, data from the GPUs 240 and 245 can read from the predetermined range of memory addresses by the CPU 215.

Memory map 220 graphically represents the range of available memory addresses in system 212. Memory map contains several apertures, or ranges of memory addresses used to communicate with the GPUs 240 and 245. Broadcast aperture 225 enables the CPU to communicate with all of the GPUs in the system 212 simultaneously. Commands and data written to the broadcast aperture are distributed to all of the GPUs 240 and 245, as well as any other GPUs in the system 222. In some systems, a bridge chip is associated with the broadcast aperture 225 and is adapted to copy data written to the broadcast aperture 225 to each GPU in the system 212.

In addition to the broadcast aperture 225, the memory map also includes a set of unicast apertures 230 and 235. Unicast apertures 235 and 230 are adapted to distribute commands and data to GPUs 240 and 245, respectively. Commands and data written to a unicast aperture will only be distributed to the GPU associated with the unicast aperture. The unicast apertures enable the CPU 215 to program GPUs 230 and 235 separately.

The use of broadcast and unicast apertures to program multiple GPUs introduces several limitations. First, there is typically a separate unicast aperture for each GPU in a system. As each typical unicast aperture can be 256 megabytes in size, systems with a large number of GPUs often need to reserves gigabytes of address space for the apertures. The large address space requirements can limit the performance of systems, and in extreme cases limit the potential number of GPUs in a system, particularly with 32-bit systems that are often limited to 4 gigabytes of total address space. Additionally, some systems require that the GPUs operating in parallel be synchronized. To prevent de-synchronization, when the CPU writes commands and data to one unicast aperture, the CPU must also write null commands and padding data to all of the other unicast apertures. This makes programming individual GPUs very inefficient.

Figure 3:
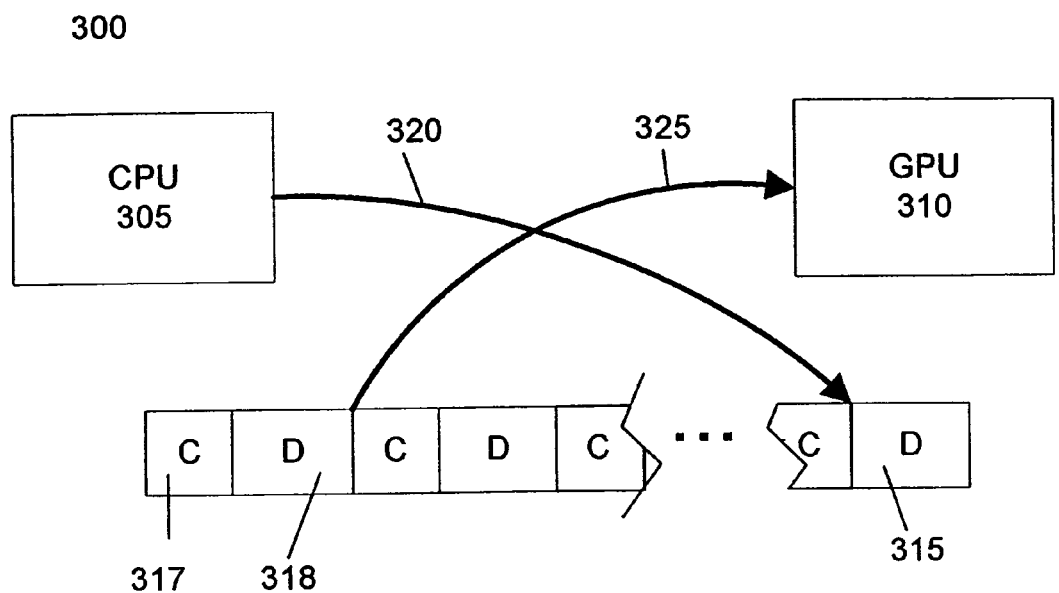
FIG. 3 illustrates a system for communicating rendering commands from a central processing unit (CPU) to a graphics processing unit (GPU) suitable for practicing an embodiment of the invention.

FIG. 3 illustrates a system 300 for communicating rendering commands from a central processing unit (CPU) 305 to a graphics processing unit (GPU) 310 suitable for practicing an embodiment of the invention. In this embodiment, the CPU 305 and the GPU 310 communicate asynchronously through a command buffer 315. Command buffer 315 is stored in memory accessible to both the CPU 305 and the GPU 310. In an embodiment, the command buffer 315 is stored in the computer system's general memory, such as memory 110 discussed in FIG. 1, and is accessible to the GPU 315 via direct memory access (DMA) transfers. Although not shown in FIG. 3, each GPU in a system with multiple GPUs uses a similar command buffer for receiving communications from the CPU 305.

Command buffer 315 stores sets of rendering commands, such as rendering command 317, and sets of rendering data, such as rendering data 318. In one embodiment, a rendering command is associated with rendering data. The rendering command defines the set of rendering processes to be performed by the GPU on an associated rendering data. In a further embodiment, the rendering data is stored in the command buffer 215 adjacent to the corresponding rendering command.

The CPU 305 writes rendering commands and data sets to the command buffer 315. The command buffer 315 can include a number of rendering commands and data sets. The CPU 305 writes commands and data sets into the command buffer 315 at the location determined by "put" pointer 320. Following each CPU write into the command buffer 315, the CPU 305 increments the put pointer 320 to the next unused location in the command buffer 315. In an embodiment, a driver software program executed by the CPU 305 translates high-level rendering commands from a rendering application into commands and data sets, which are then written into the command buffer 315. In a further embodiment, the driver software program receives high-level rendering commands via an application programming interface, for example DirectX™ or OpenGL™.

The GPU 310 reads commands and data sets from the command buffer 315. The GPU 310 reads commands and data sets from the command buffer 315 at the location determined by "get" pointer 325. Following each GPU read from the command buffer 315, the GPU 310 increments the get pointer 325 to the location of the next command or data set in the command buffer 315.

The CPU 305 and GPU 310 can access the command buffer 315 independently. In an embodiment, the CPU 305 periodically adds new commands and data sets to the command buffer 315. Simultaneously, the GPU 310 reads processes commands and data sets previously stored by the CPU 305 continuously. Provided the CPU 305 stays sufficiently far ahead of the GPU 310, the GPU 310 is able to render images without any idle time waiting for the CPU 305. In an embodiment, the CPU 305 writes commands and data sets for frames several frames ahead of the frame being rendered by the GPU 310.

In an embodiment, the command buffer is limited in size. As an example, a typical command buffer is five megabytes in size. When either the get pointer 325 or put pointer 320 reaches the end of the command buffer 315, the pointer is reset to the location of the beginning of the command buffer 315. In this manner, the command buffer 315 "wraps around," enabling the CPU and GPU to access the command buffer 315 in a continuous loop.

Figure 4:
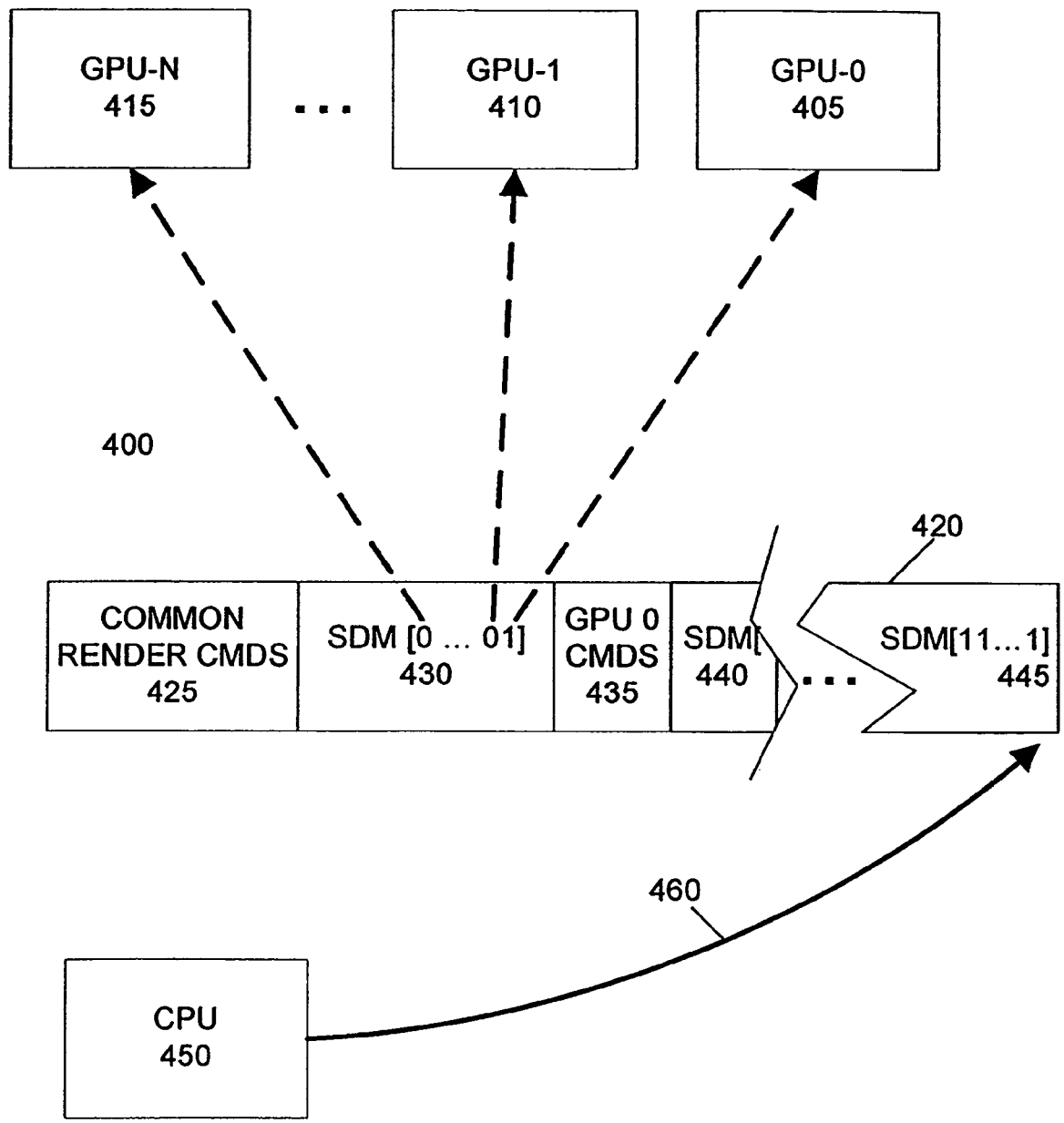
FIG. 4 illustrates a system for programming multiple graphics processing units according to an embodiment of the invention.

FIG. 4 illustrates a system 400 for programming multiple graphics processing units according to an embodiment of the invention. System 400 includes two or more GPUs, for example, ranging from GPU-0, 405 and GPU-1, 410, up to GPU-N 415. All of the GPUs receive programming from the CPU via command buffer 420. As discussed above, CPU 450 adds commands and data sets to the command buffer 420 via put pointer 460. In an embodiment, each GPU reads rendering commands and data sets from the same command buffer. In an alternate embodiment, each GPU has its own identical copy of command buffer 420. In this embodiment, a bridge chip can be used to distribute copies of the command buffer to each of the GPUs. The CPU 450 uses put pointer 460 to write commands and data sets to a broadcast aperture, thereby distributing identical commands and data sets to each of the GPUs.

Command buffer includes common rendering commands and data sets 425, which are to be read and executed by all of the GPUs. To program a subset of the GPUs in the system separately, the CPU writes a Set Device Mask (SDM) command 430 to the command buffer 420. The SDM command 430 designates the subset of GPUs to execute subsequent GPU-specific rendering commands in the command buffer, such as rendering commands 435. As discussed below, GPUs that are not designated by the SDM command 430 will ignore the GPU-specific rendering commands. However, as discussed below, the non-designated GPUs will continue to read from the command buffer to maintain synchronization. A different subset of GPUs can be designated by a second SDM command 440 to execute another group of GPU-specific rendering commands. Following one or more groups of GPU-specific rendering commands, command buffer 420 includes an SDM command 445 designating all of the GPUs in the system. One or more groups of common rendering commands following SDM command 445 will then be executed by all of the GPUs.

In an embodiment, the SDM command 430 includes a device mask designating the GPUs that will execute subsequent rendering commands. In this embodiment, each GPU is assigned a unique identifier. In a further embodiment, these identifier is assigned to each GPU (and a graphics coprocessor, if provided) by a software driver upon system initialization. Each identifier corresponds to a single bit in the device mask. If a bit in the device mask is asserted, then the associated GPU is designated to execute subsequent rendering commands. Conversely, a negated bit instructs a GPU to ignore subsequent rendering commands until its associated bit is reasserted.

For example, SDM command 430 includes a device mask with a value of "10 . . . 0." This device mask indicates that GPU-0, 405, should execute subsequent rendering commands 435, while GPUs 410 and 415 will ignore rendering commands 435. It should be noted that the device mask included with the SDM commands can include any number of bits, thereby enabling the separate programming of any number of GPUs. Further, the device mask can have any combination of asserted or negated bits. This enables the CPU to program two or more GPUs simultaneously. For example, a device mask of "100001111" would indicate that GPUs 0, 1, 2, 3, and 8 are to execute subsequent rendering commands, while GPUs 4, 5, 6, and 7 are to ignore subsequent rendering commands until their corresponding device mask bits are reasserted.

Figure 5:
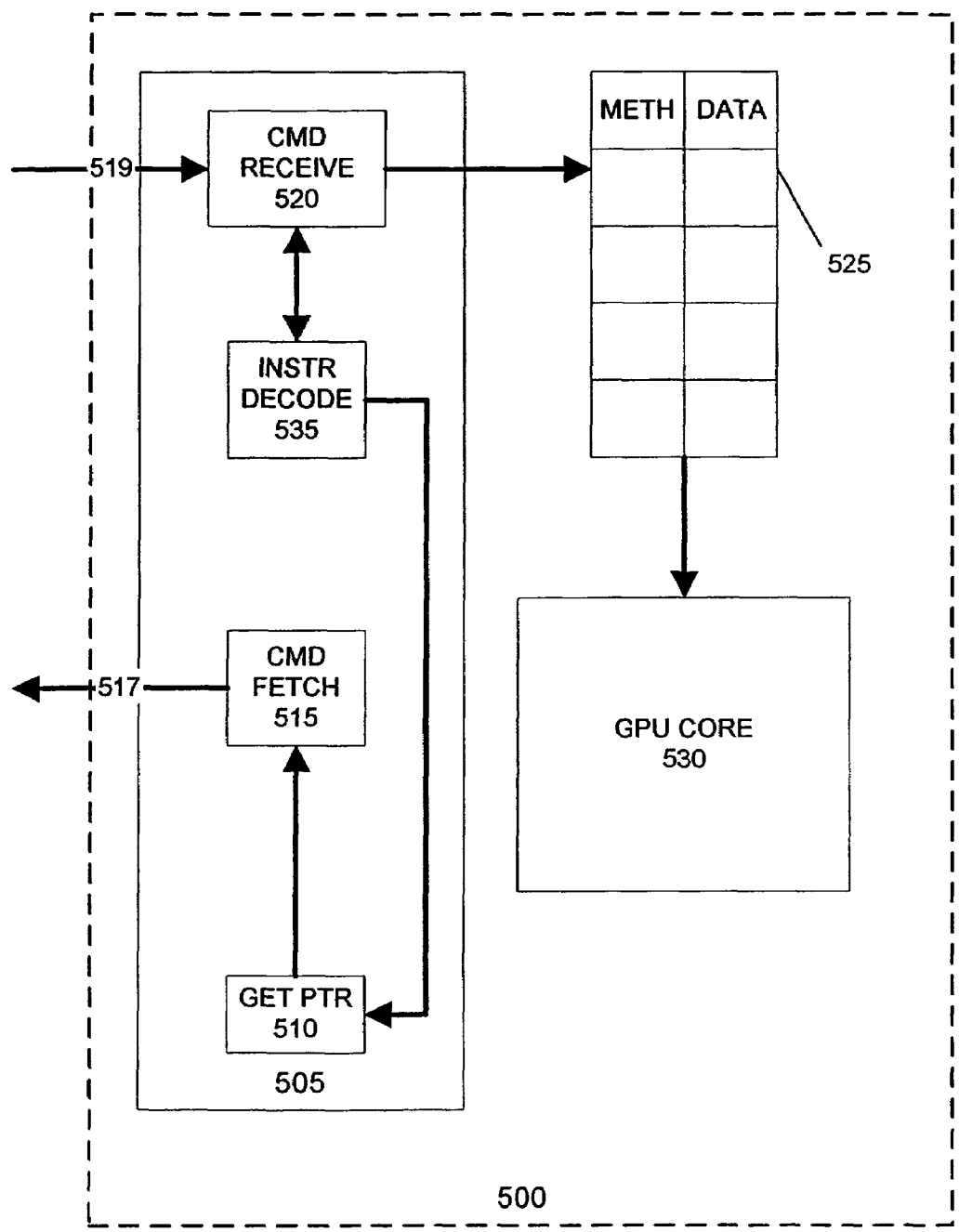
FIG. 5 is a block diagram of a graphics processing unit according to an embodiment of the invention.

FIG. 5 is a block diagram of a graphics processing unit (GPU) 500 according to an embodiment of the invention. GPU 500 includes a GPU front end 505 for retrieving and processing commands from the command buffer and a GPU core 530 for generating pixel data in response to rendering commands. Front end 505 includes a get pointer 510. In an embodiment, the get pointer 510 is stored in a specific memory register. The get pointer 510 is coupled with the command fetch unit 515. Command fetch unit 515 is adapted to initiate the retrieval of a command from the command buffer at the location indicated by the get pointer 510. Command fetch unit 515 sends a command retrieve signal 517 to the command buffer (not shown) to retrieve rendering commands and data sets from the command buffer at the location indicated by the get pointer 510.

Front end 505 includes a command receive unit 520 for receiving a rending command and data 519 from the command buffer. Command receive unit 520 determines whether the received rendering command is an instruction or a method. Rendering command 519 can be classified as either an instruction or a method. Instructions are rendering commands that determine the program flow executed by the GPU 500. Examples of instructions include a jump instruction, which sets the get pointer to a new, non-consecutive location; a no op instructions, which does nothing and is used as a placeholder; and call and return functions, which are used to enter and exit subroutines of rendering commands. The SDM command is also classified as an instruction. Methods are rendering commands that determine the pixel data output by the GPU. In embodiment 500, the front end 505 executes instructions and the GPU core executes methods.

Upon receiving an instruction, the command receive unit 520 forwards the instruction to the instruction decoder 535. Methods are similarly forwarded to method cache 525 to be retrieved and executed by the GPU core 530, subject to the SDM instruction. Upon receiving a SDM instruction, instruction decoder 535 compares the device mask with its own assigned identifier. If the associated bit of the device mask is negated, the instruction decoder 535 disables the link between command receive unit 520 and method cache 525. This causes all subsequent methods received by the GPU 500 to be discarded and ignored.

During the time when GPU 500 is ignoring rendering methods, the front end 505 continues to retrieve rendering commands from the command buffer and to execute instructions. For example, instruction decoder 535 can update the get pointer 510 if indicated by a jump, call, or return instruction. In this manner, the GPU state stays synchronized with the other GPUs, even when the methods of rendering commands are being ignored. Upon receiving a subsequent SDM instruction having the bit associated with GPU 500 reasserted, instruction decoder 535 re-enables the link between the command receive unit 520 and the instruction cache 525. As a result, subsequently received methods are added to the cache 525 and are processed by the GPU core 530.

Figure 6A:
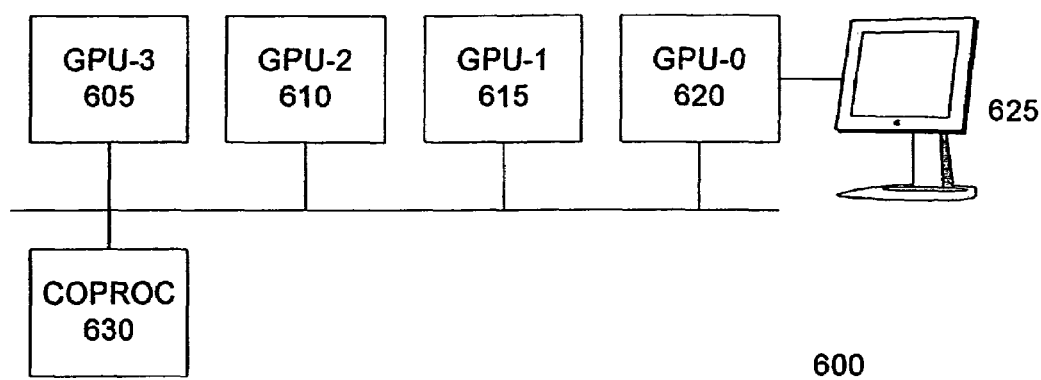
FIGS. 6A and 6B illustrate a system for rendering portions of an image in parallel according to an embodiment of the invention.
Figure 6B:
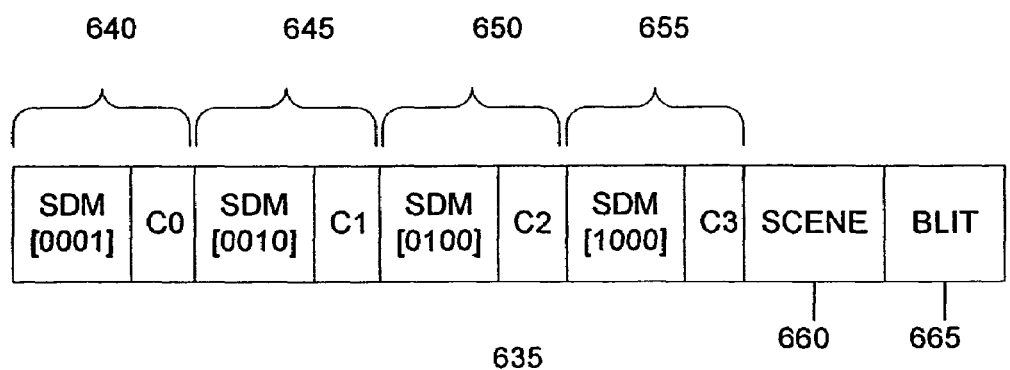

FIGS. 6A and 6B illustrate a system 600 for rendering portions of an image in parallel according to an embodiment of the invention. System 600 includes GPUs 605, 610, 615, and 620; graphics coprocessor 630, and display device 625. In an embodiment, GPUs 605, 610, 615, and 620 are located on separate circuit boards. In a further embodiment, only one GPU is directly connected to the display device 625. In yet a further embodiment, system 600 includes a coprocessor, as 4 separate graphics cards, each card having two separate GPUs. This embodiment has a total of nine different devices that can be programmed separately or simultaneously, as described generally above. Alternate embodiments may have any number of GPUs arranged on any number of circuit boards and may or may not include a coprocessor.

FIG. 6B illustrates an example command buffer 635 that programs four GPUs and a coprocessor to render portions of an image in parallel. Command set 640 includes a SDM command designating GPU 620. Command set 640 further includes one or more commands specific to GPU 620. In an embodiment, command set 640 includes a command setting the clip region for GPU 620 to the portion of the screen to be rendered by this GPU. Command set 645 includes a SDM command disabling GPU 620 and enabling GPU 615. Similar to command set 640, command set 645 includes a command for setting the clip region for GPU 615 to the portion of the screen to be rendered by GPU 615. Similarly, command sets 650 and 655 set clip regions for GPUs 610 and 605, respectively.

Following the programming of GPU-specific commands using commands sets 640, 645, 650, and 655, a SDM command with a device mask of "1111" is used to enable simultaneous programming of all of the GPUs. Common rendering commands 660 for rendering the scene are executed by all of the GPUs. Following the rendering of the separate portions of the output image, an embodiment of the invention assembles these portions into a complete output image. Blit commands 665 are used to copy the portions rendered by GPUs 605, 610, and 615 to the display memory of GPU 620. Because each image portion must be copied to a different location in the display memory of GPU 620, a further embodiment of blit commands 665 includes a set of SDM commands to selectively program GPUs 605, 610, and 615 with different copy commands. GPU 620 outputs the assembled image to display device 625.

Figure 7A:
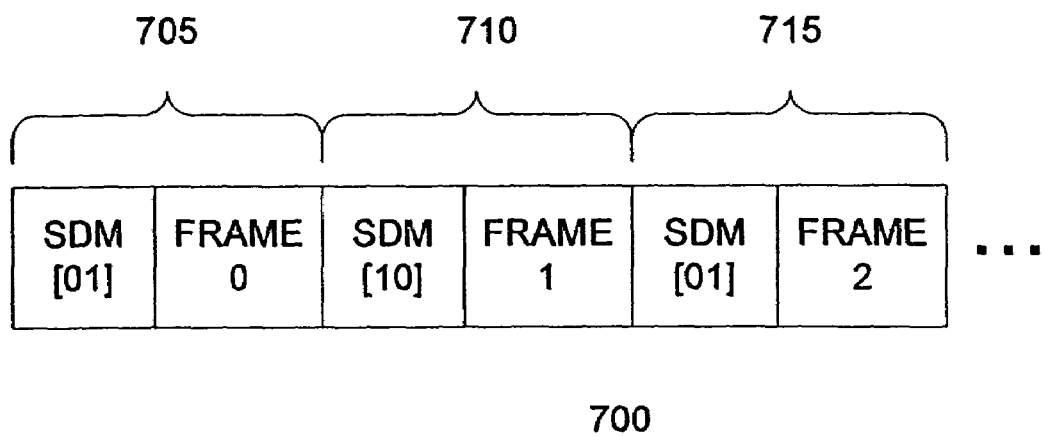
FIGS. 7A and 7B illustrate systems for implementing additional parallel rendering schemes according to an embodiment of the invention.
Figure 7B:
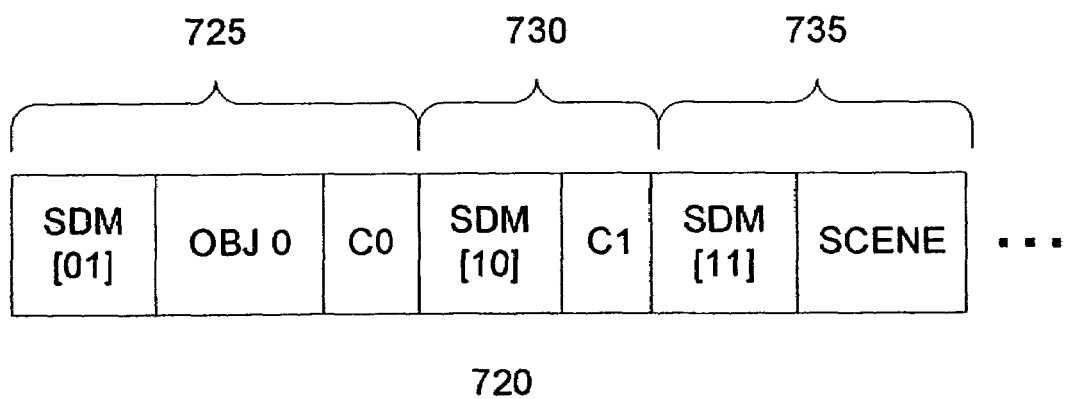

FIGS. 7A and 7B illustrate systems for implementing additional parallel rendering schemes according to an embodiment of the invention. FIG. 7A illustrates an implementation of an alternate frame rendering scheme, which uses different GPUs to simultaneously render different frames. Command buffer 700 includes rendering command set 705. Rendering command set 705 designates a first GPU for programming with rendering commands for frame 0. Rendering command set 705 is followed by rendering command set 710. Rendering command set 710 designates a second GPU for programming with rendering commands for frame 1. The first and second GPUs will render frames 0 and 1 simultaneously. Following rendering command set 710, rendering command set 715 programs the first GPU to render frame 2. This pattern of programming is repeated for all subsequent frames. In an alternate embodiment, rendering command set 715 programs a third GPU to render frame 2. In this embodiment, frame 2 is rendered simultaneously with frames 0 and 1. This embodiment can be extended to accommodate any number of GPUs.

FIG. 7B illustrates an example of split frame rendering with software-based geometry culling according to an embodiment of the invention. In this example, the software driver or other middleware application, such as an API runtime component, computes a bounding box for complicated objects. This bounding box is transformed to the image space and compared with the image portions used to divide the rendering of the output image. If the bounding box of an object does not intersect one or more of the image portions, then the rendering commands and data for the object associated with the bounding box can be omitted from the programming of the GPUs assigned to render these image portions. Because rendering commands for the object are omitted for GPUs where the object is not visible, these GPUs avoid wasteful geometry processing and better load balancing is achieved.

Command buffer 720 illustrates an example of the programming used to implement this geometry culling. Command set 725 includes a SDM command designating a first set of GPU-specific commands. These GPU-specific commands include a command setting the clip region for a first GPU to a first portion of the screen to be rendered by this GPU. Command set 725 also includes rendering commands and data for rendering an object visible or potentially visible in the assigned clip region.

Similarly, command set 730 includes a SDM command designating a second set of GPU-specific commands. The second set of GPU-specific commands include a command setting a second clip region for a second GPU to a second portion of the screen to be rendered by this GPU. In this example, the object is not visible or potentially visible in the second clip region. Thus, unlike the command set 725, rendering commands for this object are omitted from command set 730. Command set 735 includes a SDM command enabling simultaneous programming of the first and second GPUs. Command set 735 further includes common rendering commands and data for rendering the remaining elements of the scene.

This invention provides a very efficient way to program multiple GPUs and an optional graphics coprocessing without consuming an exorbitant amount of system resources. In a typical embodiment, only a single memory aperture is needed to program any number of devices. Although the invention has been discussed with respect to specific examples and embodiments thereof, these are merely illustrative, and not restrictive, of the invention. Though the invention is discussed with reference to several parallel rendering schemes, the invention can be used in any application where different hardware devices are used to render images. For example, some content may be encrypted for security or for digital rights management. A decryption-capable graphics device can be programmed to render the encrypted content, while other graphics devices in the system render the non-encrypted content. Thus, the scope of the invention is to be determined solely by the claims.

What is claimed is:

1. A graphics device adapted to operate in parallel with at least one other graphics device, the first graphics device comprising:
   a core unit adapted to execute commands;
   a front-end unit adapted to receive commands and deliver at least some of the received commands to the core unit, wherein the graphics device and the at least one other graphics device receive the same set of commands, and wherein the commands comprise control commands associated with program flow and rendering commands associated with determining pixel output of the graphics device; and
   wherein the front-end unit is further adapted to receive a first device mask command, the first device mask command including a reference to a unique identifier associated with the graphics device the identifier corresponding to a single bit in the device mask, and to begin discarding rendering commands received after the first device mask command when the bit associated with the graphics device is negated, rather than delivering the rendering commands to the core unit.

2. The graphics device of claim 1, wherein the front-end unit is further adapted to execute the control commands associated with program flow.

3. The graphics device of claim 1, wherein the front-end unit is further adapted to resume the communication of received rendering commands with the core unit following the receipt of a second device mask command that includes a reference to the unique identifier associated with the graphics device.

4. The graphics device of claim 3, wherein the first and second device mask commands include a bit associated with the unique identifier.

5. The graphics device of claim 1, further comprising a cache unit in communication with the front-end unit and the core unit.

6. The graphics device of claim 1, wherein the graphics device is a graphics processing unit.

7. The graphics device of claim 1, wherein the graphics device is a coprocessor.

* * * * *